US006987454B2

(12) United States Patent
Narayanaswami et al.

(10) Patent No.: US 6,987,454 B2
(45) Date of Patent: Jan. 17, 2006

(54) POWER MANAGEMENT

(75) Inventors: Chandrasekhar Narayanaswami, Wilton, CT (US); Mandayam T. Raghunath, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 10/652,142

(22) Filed: Aug. 29, 2003

(65) Prior Publication Data

US 2005/0049760 A1 Mar. 3, 2005

(51) Int. Cl.

| | |
|---|---|
| ***B60R 25/10*** | (2006.01) |
| ***G06F 1/26*** | (2006.01) |
| ***G06F 1/32*** | (2006.01) |
| ***G08B 13/14*** | (2006.01) |
| ***G08B 23/00*** | (2006.01) |

(52) U.S. Cl. .............................. 340/572.1; 340/426.1; 340/573.1; 340/574; 340/825.31; 713/300; 713/310; 713/323; 713/324

(58) Field of Classification Search ............ 340/573.1, 340/426.17, 426.1, 572.1, 573.4, 825.31; 713/300–340

See application file for complete search history.

(56) References Cited

U.S. PATENT DOCUMENTS

| | | | | |
|---|---|---|---|---|
| 6,418,536 | B1 * | 7/2002 | Park | 713/323 |
| 6,665,805 | B1 * | 12/2003 | Tsirkel et al. | 713/323 |
| 6,734,845 | B1 * | 5/2004 | Nielsen et al. | 345/211 |
| 6,771,168 | B1 * | 8/2004 | Nguyen | 340/426.17 |
| 2003/0051181 | A1 * | 3/2003 | Magee et al. | 713/320 |

* cited by examiner

*Primary Examiner*—Jeffery Hofsass
*Assistant Examiner*—Lam Pham
(74) *Attorney, Agent, or Firm*—Ference & Associates

(57) ABSTRACT

Power management using radio frequency identification (RFID) tags is disclosed. A device is equipped or connected with a low power detector that can detect the proximity of an RFID tag worn by a user of the device. The RFID tag preferably obtains energy from the detector and transmits a signal back to the detector telling the detector that the tag is in the vicinity. If the tag is too far away from the detector, the RFID tag is unable to respond as a result the detector will notice the absence of the tag. If the device detects the user is near the device, then the device manages power differently than when the user is not near the device.

20 Claims, 3 Drawing Sheets

POWER MANAGEMENT

FIELD OF THE INVENTION

This invention relates generally to energy management. More particularly, the invention relates to improved energy management using RFID tags.

BACKGROUND OF THE INVENTION

During the past two decades there has been a rapid proliferation of portable devices such as cell phones, pagers, laptop computers, CD and DVD players, and the like. Such portable devices typically depend upon batteries of some sort for their energy requirements and the operating duration of the devices is thus governed by the available energy, which in turn is affected by the rate at which the available energy is used or depleted. There has also been an increased awareness of the need to increase energy efficiency in non-portable devices. For example, the United States government has an "Energy Star" program which helps businesses and individuals protect the environment through superior energy efficiency. See [http://]www.energystar.gov In order to conserve electricity, or to extend battery life, e.g., in laptop computer systems, various power-saving methods are used. These may include monitor timeouts, hard disk spin downs, and the computer entering a "sleep" state after a period of inactivity. On certain processor systems, it is also possible to adjust the operating clock frequency, or internal operating voltage, of the central processing unit (CPU). When the processor runs at slower clock speeds, or lower voltages, it requires less power. As a significant amount of power is consumed by the CPU, reducing clock speeds and voltages is a reasonable strategy to extend operational time when running off a battery. For many of the most common applications, a CPU running at a reduced speed is usually sufficiently fast to not incur any inconvenience for the user.

The current method used to set the power saving modes of a computer or other device involves accessing a power management program. This program may be accessed through a BIOS (Basic Input Output System) setup program, through the operating system, or through an interface. In any case, to efficiently utilize and conserve power under various operating conditions, the user must set appropriate power-saving parameters. As most people do not enjoy adjusting such system internals, they tend to set the processor speed to its highest value and leave it at that. On laptop systems, this can cause an unnecessary loss of battery time.

Furthermore, current laptop power management schemes or parameters typically rely upon timeout values or on explicit user input to initiation transition into lower power modes. A drawback of this method is that this is not optimal for power management. In many cases the user may just walk away from the machine and not want to bother with the hassle to manually initiate a transition to a low power state. Using timeout values, i.e., detecting that there is no activity on the keyboard, mouse, or other input device, for a preselected amount of time, and go to the lower power state has the problem that user typically set large timeout values. Users do this because they do not want this machine to go into low power state sometimes because they may doing something else while near the computer or other device but want the display screen to be active; this may be the case because the user would like to see information from automatic software agents, such as stock tickers, instant messages, etc., that may be displayed even if there is no user activity on the keyboard, mouse, or other input device. Alternatively, a user may be playing some media, such as an audio file, movie file, DVD movie, or the like, where it is unlikely there is any activity on the keyboard, mouse, or other input device. In addition, when a user is making a screen show presentation it is unlikely there is anything other than occasional activity on the keyboard, mouse, or other input device.

SUMMARY OF THE INVENTION

In accordance with at least one presently preferred embodiment of the present invention, there is broadly contemplated a system and method power management based upon the proximity of an authorized user to the device whose power is being managed.

In summary, one aspect of the present invention provides a method for managing energy consumption of a device, the method comprising the steps of: ascertaining the proximity of an user to the device; and adjusting the energy consumption of the device, whereby the energy consumption is adjusted based upon the proximity of the user to the device.

A further aspect of the invention provides a system for managing energy consumption of a device, comprising: an arrangement for ascertaining the proximity of an user to the device; and an arrangement for adjusting the energy consumption of the device, whereby the energy consumption is adjusted based upon the proximity of the user to the device.

Furthermore, an additional aspect of the invention provides a program storage device readable by machine, tangibly embodying a program of instructions executable by the machine to perform method steps for managing energy consumption of a device, said method comprising the steps of: ascertaining the proximity of an user to the device; and adjusting the energy consumption of the device, whereby the energy consumption is adjusted based upon the proximity of the user to the device.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

The present invention provides an improved system and method for power management using unique person identifiers or RFID (Radio Frequency Identification) tags. Such system and method allows automated capturing and indexing of individual or group power settings according to each unique person and/or group identifier.

Preferably one or more RFID tags or other suitable machine-readable tags are worn by each authorized user of a battery operated device. Each RFID tag contains a unique person identifier number ("UPIN") which is used to match the particular individual to any relevant power settings for that individual. Optionally, each tag may also include a unique group identifier number ("UGIN") which may be used to match a defined group of individuals to any power settings for any individual(s) within the defined group.

Readers may be integral with the battery operated device, or otherwise operably connected thereto, and are able to read the RFID tags. Preferably the readers are capable of reading each tag (and/or multiple tags) over a read distance of anywhere from 4"–60" or more and in a manner that does not require an overt act by the user. Suitable tags and readers are available from RFID, Inc. under the Taggit.™. brand. Alternatively, a variety of other suitable tags and readers can be used.

Preferably, the tags are passive in nature. The RF tags, however, may be active. Active tags are not preferred, however, since the user will have to ensure that the RF tag is kept supplied with energy, either using fresh batteries or regularly recharging the batteries used to power the active device. The advantage of using active tags, however, is an increase in the range of detection.

Figure 1:
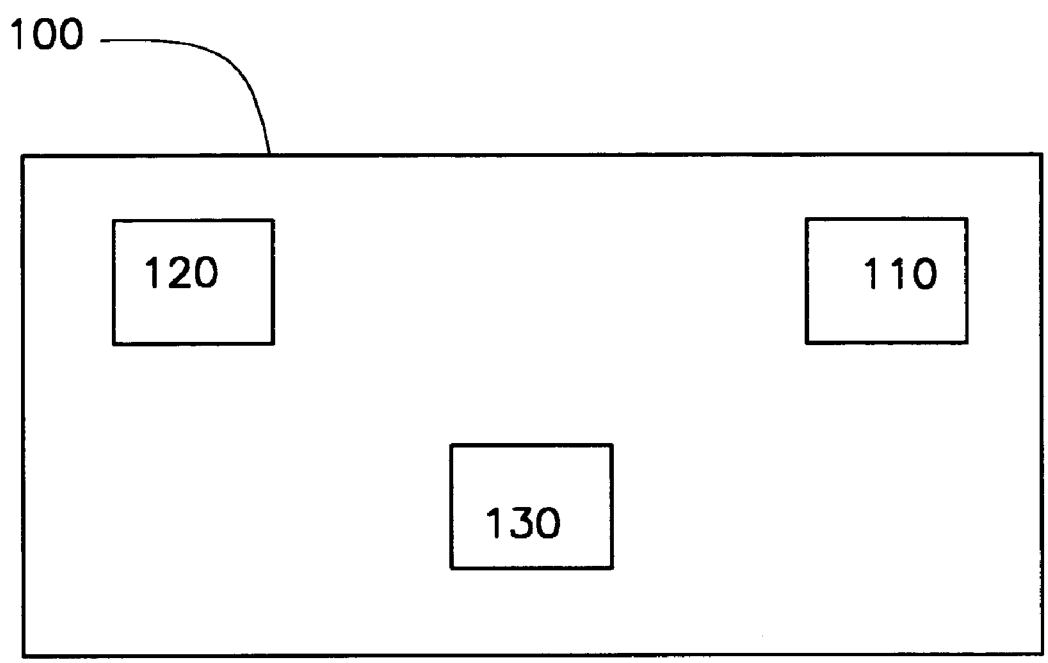
FIG. 1 shows a schematic representation of a battery operated device wherein the RFID tag reader is integral with the device in accordance with the present invention.

FIG. 1 is a schematic representation of a battery operated device wherein the RFID tag reader is integral with the device in accordance with the present invention. The battery is depicted by reference numeral 110, the RFID tag reader depicted by reference numeral 120, and a microprocessor in the device is depicted by reference numeral 130. In this embodiment, the RFID tag obtains energy from detector 120 and transmits a signal back to detector 120 informing the detector that the tag is in the vicinity of the detector. If the tag is too far away from the detector, the RFID tag is unable to respond and as a result the detector will notice the absence of the tag.

The user's battery operated device periodically checks for the proximity of the user's wearable tag. The frequency of checking may be selected by the appropriate personnel, i.e., a system administrator or the like, based upon trade-offs with respect to the energy cost of checking and the amount of energy savings possible due to quick detection of the user's departure. If proximity of the user is detected, the system may choose to only leverage low power modes which are easy and quick to terminate, such as, spinning down disks or slowing the speed of the CPU clock. If proximity is not detected the system may leverage other low power modes such as turning off the display, entering a suspend or even a hibernate state. These examples of actions which may be taken to save power are illustrative, and are not inclusive.

Figure 2:
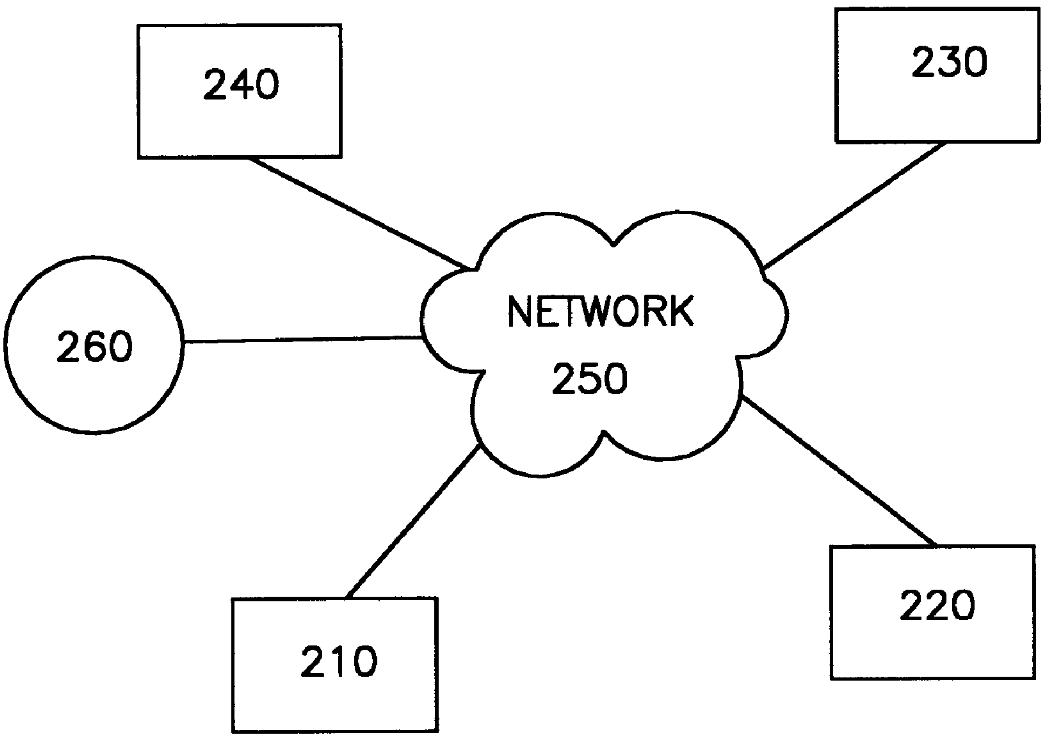
FIG. 2 shows a schematic representation a situation where the RFID tag detector is operatively coupled to, but not integral with, the battery operated device, in accordance with the present invention.

FIG. 2 is a schematic representation a situation where the RFID tag detector is operatively coupled to, but not integral with, the battery operated device, in accordance with the present invention. Such an arrangement may be used in an office environment where there are multiple devices. Devices 210, 220, 230 and 240 are operative connected to tag detector 260 through network 250. The connections to network 250 may be either physical in nature (e.g., hard-wired) or non-physical (e.g., wireless). Tag reader 260 is then able to determine, as discussed above, whether a user was in the office or not and provide this information to all of the machines of interest in the user's office. In this embodiment, the tag reader may be permanently connected to the electrical mains and therefore not be as constrained by the amount of energy it consumes as part of the reading process. However, a similar tag reader would be required at each location where the user is likely to use the device, and in addition, the devices themselves will need to be aware of where they are physically located, which may be determined, for example, from which network address the device is assigned or to which muter the device is connected.

While the present invention has been described in connection with the use of an RFID tag, it should be understood the present invention also preferably includes provisions for device operation without an RFID tag. By way of illustration, it is entirely possible for a user of a device to forget to bring his assigned RFID tag to the device location on any given day. In order to provide for operation of devices in accordance with the present invention, it is preferable that an override mechanism be provided by which a device will behave as if the user was always in proximity to the device.

Figure 3B:
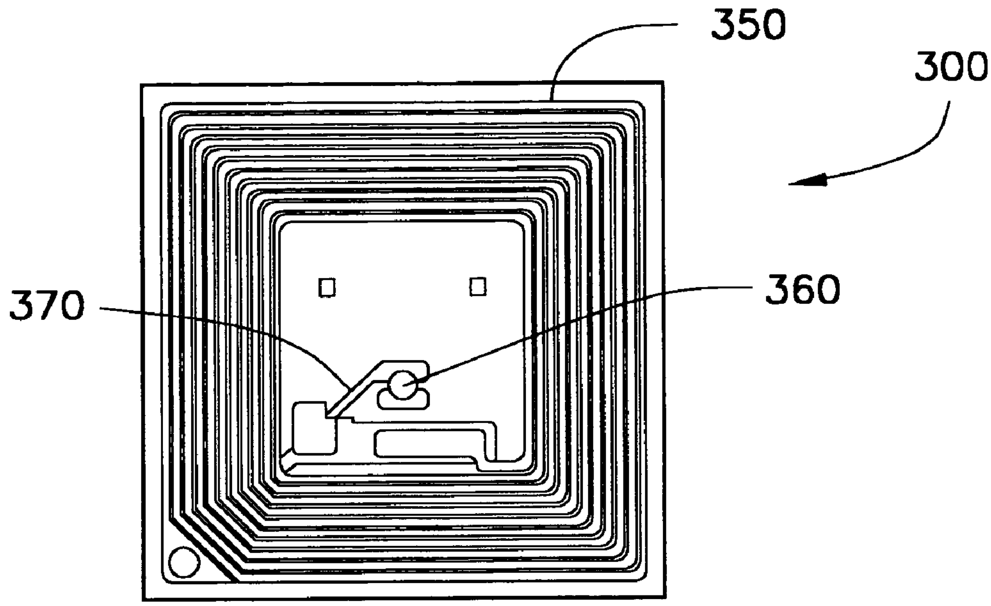
FIGS. 3A and 3B are front and rear views, respectively, of an RFID tag for use with the systems of FIGS. 1 and 2 and having features and advantages in accordance with the present invention
Figure 3A:
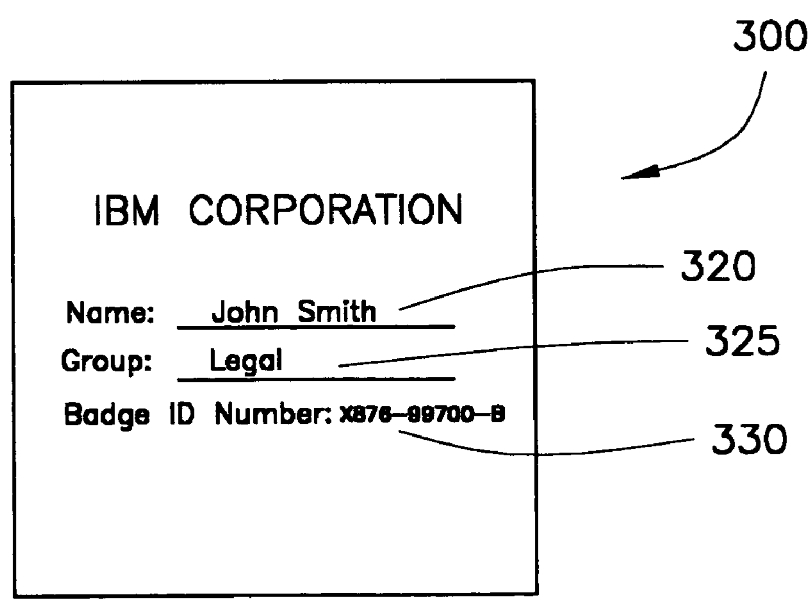

FIGS. 3A and 3B are front and rear views, respectively, of one embodiment of an RFID tag 300 for use with the systems of FIGS. 1 and 2 and having features and advantages in accordance with the present invention. This particular tag illustrated is sold under the brand name Taggit.™. and is available from TIRIS, a division of Texas Instruments, Inc. The tag 300 and various associated readers are commercially available in a wide variety of configurations, sizes and read ranges. RFID tags having a read range of between about 5" and 60" are particularly preferred, although shorter or longer read ranges may also be acceptable.

The particular tag 300 illustrated is intended to be affixed or adhered to the front of a shirt or blouse worn by a user. The front of the tag may include any number of designs or other information pertinent to its application. For example, the user's name 320 and group affiliation 325 may be indicated for convenient reference. The tag's unique person identification number (UPIN) and/or unique group identification number (UGIN) may also be displayed as a badge number 330. The obverse side of the tag 300 contains the tag electronics. This generally comprises a spiral wound antenna, a radio frequency transmitter chip 360 and various electrical leads and terminals 370 connecting the chip 360 to the antenna.

The tag 300 is activated by a radio frequency signal that is broadcast by an adjacent reader or activation device. The signal impresses a voltage upon the antenna 350, which is then used to power the chip 360. When activated, the chip 360 transmits via radio frequency a unique identification number corresponding to the UPIN and/or UGIN. This signal is then received and processed by the associated reader as described above. If desired, the tag 300 may also be configured for read/write communications with an associated reader/writer. Thus, the unique tag identifier number (UPIN or UGIN) can be changed or other information may be added to the tag 300, as needed or desired.

An RFID tag, such as tag 300 shown in FIG. 3A, may be associated with an other object. For example, an RFID tag may be placed in, embedded in, fabricated in, or the like, of an article typically worn by a user. Illustrations of common such articles are wristwatch, corporate identification badge, jewelry, shoes, etc. If such an article is one that is not typically worn every day by a user, it is presently preferred to have the same or similar RFID tags placed, embedded, fabricated, or the like, into multiple articles possessed by a user.

Although the invention has been described in the context of battery operated devices, it is understood that the invention may also be used in connection with any device where power management is desired. It is also to be understood that the present invention, in accordance with at least one presently preferred embodiment, has elements which may be implemented on at least one general-purpose computer running suitable software programs. These elements may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for managing energy consumption of a device, the method comprising the steps of:

defining a plurality of power modes, wherein the power mode is associated with energy consumption of the device;

ascertaining the proximity of an user to the device, wherein an RFID tag and RFID tag detector are used in connection with ascertaining the proximity of the user to the device; and selecting the power mode based upon the proximity of the user to the device, wherein said device selects from a plurality of power modes based upon a unique identifier associated with the RFID tag.

2. The method of claim 1, wherein energy is provided to the device by batteries.

3. The method of claim 1, wherein the RFID tag is an active RFID tag.

4. The method of claim 1, wherein the energy consumption of the device is decreased when the user is not proximate to the device.

5. The method of claim 1, wherein the proximity of the user to the device may be varied.

6. The method of claim 1, wherein said RFID tag detector is centrally located and operatively coupled to a plurality of devices.

7. The method of claim 1, wherein said unique identifier is a unique personal identifier number (UPIN).

8. The method of claim 1, wherein said unique identifier is a unique group identifier number (UGIN).

9. A system for managing energy consumption of a device, comprising:

defining a plurality of power modes, wherein the power mode is associated with energy consumption of the device;

an arrangement for ascertaining the proximity of an user to the device, wherein an RFID tag and RFID tag detector are used in connection with ascertaining the proximity of the user to the device; and an arrangement for selecting the power mode based upon the proximity of the user to the device, wherein said device selects from a plurality of power modes based upon a unique identifier associated with the RFID tag.

10. The system of claim 9, wherein energy is provided to the device by batteries.

11. The system of claim 9, wherein the RFID tag is an active RFID tag.

12. The system of claim 9, wherein the energy consumption of the device is decreased when the user is not proximate to the device.

13. The system of claim 9, wherein the proximity of the user to the device at which the energy consumption of the device is adjusted may be varied.

14. The method of claim 9, wherein said RFID tag detector is centrally located and operatively coupled to a plurality of devices.

15. The system of claim 9, wherein said unique identifier is a UPIN.

16. The system of claim 9, wherein said unique identifier is a UGIN.

17. A program storage device readable by machine, tangibly embodying a program of instructions executable by the machine to perform method steps for managing energy consumption of a device, said method comprising the steps of:

defining a plurality of power modes, wherein the power mode is associated with energy consumption of the device;

ascertaining the proximity of an user to the device, wherein an RFID tag and RFID tag detector are used in connection with ascertaining the proximity of the user to the device; and selecting the power mode based upon the proximity of the user to the device, wherein said device selects from a plurality of power modes based upon a unique identifier associated with the RFID tag.

18. The program storage device of claim 17, wherein said RFID tag detector is centrally located and operatively coupled to a plurality of devices.

19. The program storage device claim 17, wherein said unique identifier is a UGIN.

20. The program storage device of claim 17, wherein said unique identifier is a UGIN.

* * * * *